Oct. 13, 1936.  R. K. PRATT, SR  2,057,055
COMBINATION FISH NET AND BASKET
Filed April 21, 1936

Inventor
Robert K. Pratt, Sr.

By Clarence A. O'Brien and
Hyman Berman
Attorneys

Patented Oct. 13, 1936

2,057,055

UNITED STATES PATENT OFFICE 2,057,055

COMBINATION FISH NET AND BASKET

Robert K. Pratt, Sr., Cape Charles, Va.

Application April 21, 1936, Serial No. 75,608

2 Claims. (Cl. 43—55)

This invention relates to a device which may be used either as a fish net or a basket for carrying live fish or both.

An object of the present invention is to provide a device of this character which can be cheaply and economically constructed and which will be found especially useful for hand line fishermen, fishing from a boat, and which can be used in the nature of a net to facilitate capturing the game and also for carrying the live game about.

The invention together with its objects and advantages will be best understood from a study of the following description taken in connection with the accompanying drawing wherein.

Figure 1:
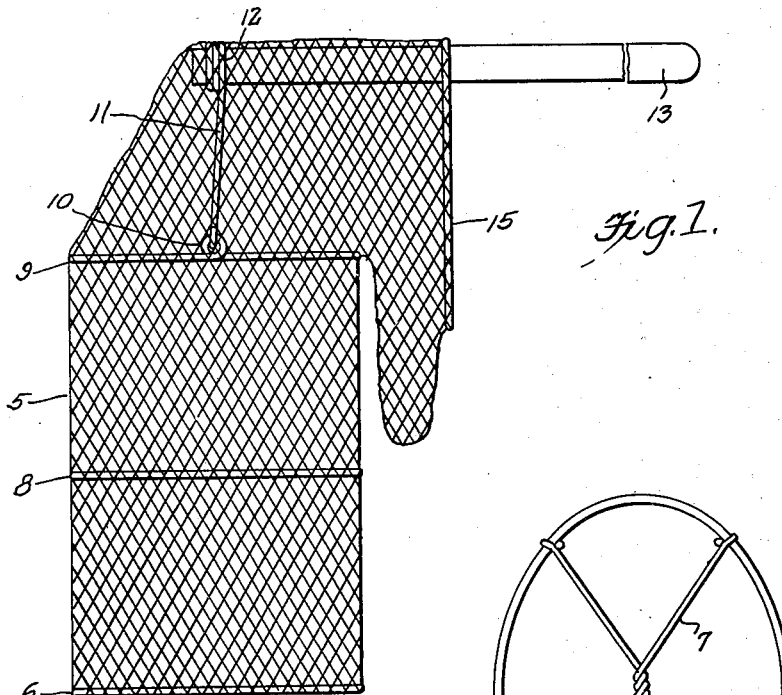
Figure 1 is a side elevational view of the device.

Referring to the drawing by reference numerals it will be seen that in accordance with the present invention there is provided an elongated sack or receptacle 5 preferably formed of net material closed at one end and open at its respective opposite end.

Figure 2:
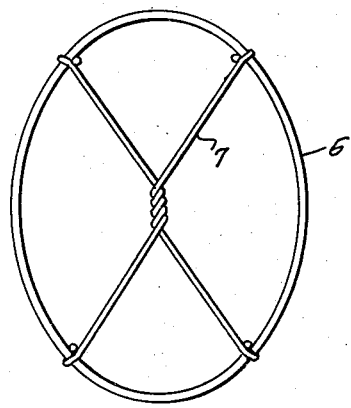
Figure 2 is a plan view of the bottom ring forming part of the invention.

In the bottom of the receptacle or basket 5 is a somewhat oval shaped frame or ring 6 suitably secured in position in any suitable manner and having reinforcing rods 7 connected at their ends with the rings at suitable points thereon and their intermediate portions relatively twisted about one another as clearly shown in Figure 2 to provide a substantial reinforced bottom structure for the member 5.

Also spaced upwardly from the bottom thereof the member 5 is provided internally with a substantially oval shaped frame or ring 8 formed of wire secured to the peripheral wall of the member 5 in any suitable manner.

Above the ring 8 there is disposed a third ring 9 of oval shape which is secured within the bag 5 in any suitable manner and which at opposed opposite points is formed to provide eyes 10 with which are suitably engaged the ends of a bail 11.

Bail 11 is formed of wire and at its closed end the wire of the bail is coiled as at 12 to provide an eye or sleeve adapted to receive one end of a handle 13 of wood or other suitable material.

Figure 3:
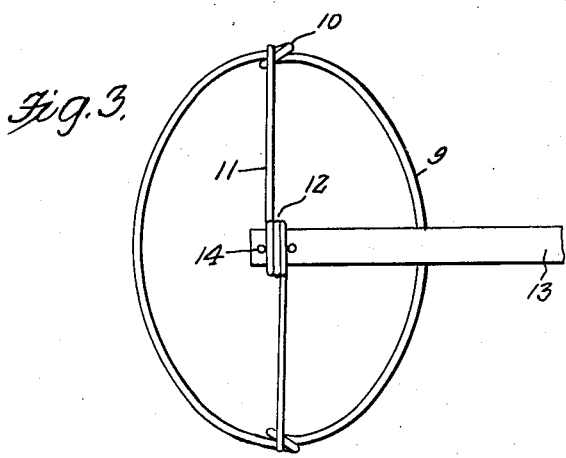
Figure 3 is a plan view of a handle and an intermediate ring associated therewith.

Handle 13 at said one end is provided with a pair of spaced apart lateral pins 14 that engage the respective opposite ends of the eye or sleeve 12 in a manner shown in Figure 3 for detachably connecting the handle with the bail 11.

Figure 4:
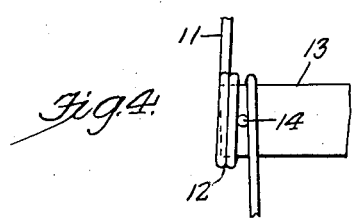
Figure 4 is a fragmentary detail plan view showing the manner of detachably connecting the handle with the intermediate ring.

In connecting the pin-equipped end of the handle 13 with the sleeve 12 said end of the handle is introduced into the sleeve 12 and by rotating the handle 13 the forwardmost pin 14 will engage in the convolute of the sleeve 12 in a manner suggested in Figure 4 and cause a feeding of the end of the handle 13 through the sleeve 12 to the final position suggested in Figure 3. Obviously to detach the handle from the bail 11 the operation just described is reversed.

At the mouth or open end thereof the basket or receptacle 5 is reinforced by a frame member 15 of wire as shown in Figure 1.

In using the device as a fish net the handle 13 is engaged with the bail 11 in the manner just described and as shown in Figure 1 so that the mouth end 15 is suspended from the handle laterally of the basket thus rendering it comparatively easy to place the fish or the like into the basket.

When not in use the handle 13 may be readily disengaged from the bail 11 and the basket collapsed to a relatively small compact for storage purposes.

Having thus described the invention what is claimed as new is:

1. In a device of the character described, a basket formed of net material and closed at one end and open at its opposite end, a frame secured within the basket between said ends, a bail connected with the frame at opposite sides of the frame, a handle, and interengaging means on the handle and said bail for detachably connecting one end of the handle with said bail.

2. In a device of the character described, a basket formed of net material, said basket being substantially tubular in form and closed at one end and open at its opposite end, a frame member secured within the basket intermediate said ends, a bail pivotally connected with said frame member, said bail being formed of wire and having at its closed end an integral coil, and a handle having an end adapted to be inserted axially through said coil, and spaced pins on said end of the handle cooperable with said coil for feeding said end of the handle through the coil and for securing said end of the handle engaged with the bail in a detachable manner.

ROBERT K. PRATT, Sr.